(12) United States Patent
Tateno

(10) Patent No.: US 6,604,454 B1
(45) Date of Patent: Aug. 12, 2003

(54) FRUIT AND VEGETABLE CUTTING AND SQUEEZING DEVICE

(76) Inventor: Chikara R. Tateno, 2430 Camden Ct., Santa Cruz, CA (US) 95065

( * ) Notice: Subject to any disclaimer, the term of this patent is extended or adjusted under 35 U.S.C. 154(b) by 0 days.

(21) Appl. No.: 10/227,791

(22) Filed: Aug. 26, 2002

(51) Int. Cl.[7] .......................... A47J 43/00; A47J 43/25; A47J 43/28; A47J 44/00; B30B 9/00
(52) U.S. Cl. ............................ 99/510; 99/495; 241/93; 241/169.1
(58) Field of Search .................. 99/495, 492, 509–513; 241/92, 93, 169.1, 37.5, 282.1, 101.1, 100, 168, 222, 273.1, 273.2, 273.3, 278.1, 280; 100/110, 116, 125, 213; 426/112, 115, 124, 130

(56) References Cited

U.S. PATENT DOCUMENTS

| | | | | |
|---|---|---|---|---|
| 782,618 A | * | 2/1905 | Minyard | 99/495 X |
| 2,271,175 A | * | 1/1942 | Mantelet | 241/93 X |
| 2,602,596 A | * | 7/1952 | Jones et al. | 241/93 X |
| 2,955,530 A | * | 10/1960 | Nilo | 100/125 X |
| 2,974,887 A | * | 3/1961 | Grandinetti | 241/169.1 X |
| 4,711,167 A | * | 12/1987 | Sano | 99/510 |
| 4,958,557 A | * | 9/1990 | Fiala | 99/495 X |
| 5,364,037 A | * | 11/1994 | Bigelow | 241/93 |
| 5,660,341 A | * | 8/1997 | Perkins et al. | 99/510 X |
| 5,702,061 A | * | 12/1997 | Kennedy et al. | 241/93 |
| 5,906,154 A | * | 5/1999 | Yoon et al. | 99/510 |
| 6,244,529 B1 | * | 6/2001 | Tardif et al. | 99/495 X |
| 6,435,080 B1 | * | 8/2002 | Zariengo | 99/510 |

* cited by examiner

Primary Examiner—Timothy Simone
(74) Attorney, Agent, or Firm—Jeffrey A. Hall

(57) ABSTRACT

A device for cutting, shaving, mincing, grinding, and squeezing foods has an outer housing element with a first disc element positioned therein. An inner shaft element is slidably positioned within the outer housing element. The inner shaft element has one or more positioning tracks or channels for positioning a cutting disc within the inner shaft element. A control mechanism for controlling the depth of a cut stroke of the inner shaft element is secured to the inner shaft element, and a handle is secured to the inner shaft element. The first disc element and the cutting disc may be in various configurations and cutting styles, such as a plurality of spaced apertures, various grate configurations, spaced cutting edges, cones, squares, and the like.

19 Claims, 2 Drawing Sheets

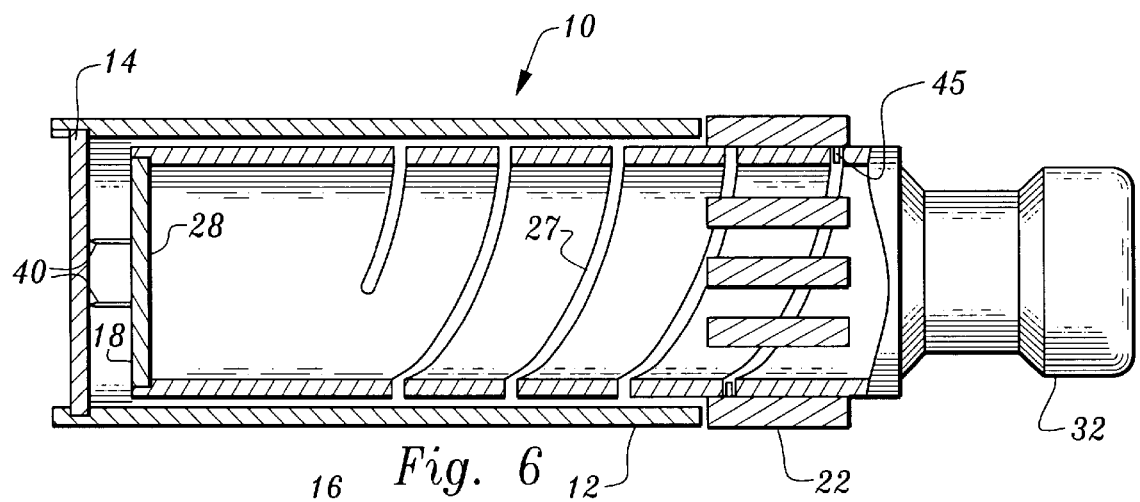
Fig. 6
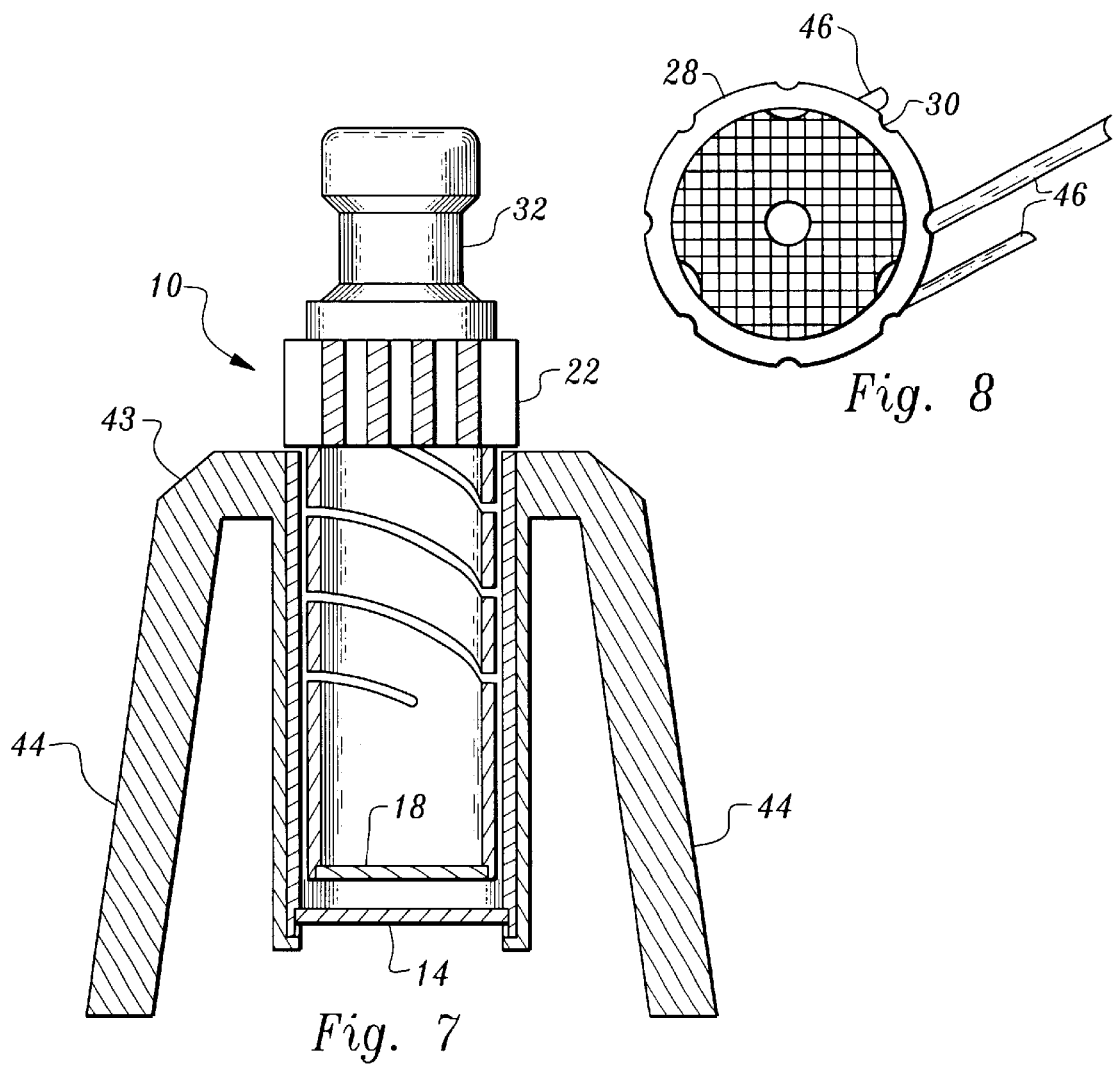
Fig. 7
Fig. 8

US 6,604,454 B1

FRUIT AND VEGETABLE CUTTING AND SQUEEZING DEVICE

BACKGROUND OF THE INVENTION

37 C.F.R. 1.77(a)(8)

1. Technical Field

This invention relates to cutting, shaving, mincing, grinding, and squeezing devices for fruits and vegetables, and more particularly to a portable hand operated device for cutting, shaving, mincing, squeezing, and grinding fruits and vegetables.

2. Background Art

Various cutting, shaving, mincing, grinding, and squeezing devices for fruits and vegetables have been proposed and implemented. In recent years there has been a tremendous surge in the consumption of fruits and vegetables, and increased variability in their method of preparation both in restaurants and in homes. This surge in consumption is part in due to the surge in consumption of all fruits and vegetables, and part in due to the influences of various ethnic and foreign foods available.

The present invention is a safe, efficient, highly versatile device for cutting, shaving, mincing, grinding, and squeezing fruits, vegetables, cheese, or other foods. The device may be used to shave foods such as garlic, ginger, cheese or the like. It may also be conveniently used for providing square cuts of a food such as garlic or ginger, or used to squeeze foods such as lemons or mushrooms, for example. The device may be used to cut a variety of foods in different ways, such as apples, potatoes, radishes, cheese, in slices, squares, shredding cuts, and the like.

Accordingly, it is the primary object of this invention to provide a cutting, shaving, mincing, grinding, and squeezing device for fruits, vegetables, and other foods, which allows for the rapid, convenient, safe, and clean, shaving, cutting, squeezing operations, and which is inexpensive to clean, use, and manufacture.

Additional objects and advantages of the invention will be set forth in the description which follows, and in part will be obvious from the description, or may be learned by practice of the invention. The objects and advantages of the invention may be realized and obtained by means of the instrumentality's and combinations particularly pointed out in the appended claims.

BRIEF SUMMARY OF THE INVENTION

37 C.F.R. 1.77(a)(7)

To achieve the foregoing objects, and in accordance with the purpose of the invention as embodied and broadly described herein, a device for cutting, shaving, mincing, grinding, and squeezing foods has an outer housing element with a first disc element positioned therein. An inner shaft element is slidably positioned within the outer housing element. The inner shaft element has one or more positioning tracks or channels for positioning a cutting disc within the inner shaft element. A control mechanism for controlling the depth of a cut stroke of the inner shaft element is secured to the inner shaft element, and a handle is secured to the inner shaft element. The first disc element and the cutting disc may be provided in various configurations and cutting styles, such as discs having a plurality of spaced apertures, various grate configurations, spaced cutting edges, cones, squares, and the like.

BRIEF DESCRIPTION OF THE DRAWINGS

The accompanying drawings, which are incorporated in and constitute a part of the specification, illustrate a preferred embodiment of the invention and, together with a general description given above and the detailed description of the preferred embodiment given below, serve to explain the principles of the invention.

FIG. 6, shows such a device with a pin support for positioning food items, according to the invention.

FIG. 7, shows such a device in a stand, according to the invention.

FIG. 8 shows an optional disc with guide legs for securing in inner shaft element, according to the invention.

DETAILED DESCRIPTION OF THE INVENTION

37 C.F.R. 1.77(a)(10)

Reference will now be made in detail to the present preferred embodiments of the invention as illustrated in the accompanying drawings.

In accordance with the present invention, there is provided in a preferred embodiment of the invention, a device for cutting, shaving, mincing, grinding, and squeezing foods has an outer housing element with a first disc element positioned therein. An inner shaft element is slidably positioned within the outer housing element. The inner shaft element has one or more positioning tracks or channels for positioning a cutting disc within the inner shaft element. A control mechanism for controlling the depth of a cut stroke of the inner shaft element is secured to the inner shaft element, and a handle is secured to the inner shaft element. The first disc element and the cutting disc may be in various configurations and cutting styles, such as discs having a plurality of spaced apertures, various grate configurations, spaced cutting edges, cones, squares, mincing surfaces, squeezing surfaces, and the like.

Figure 1:
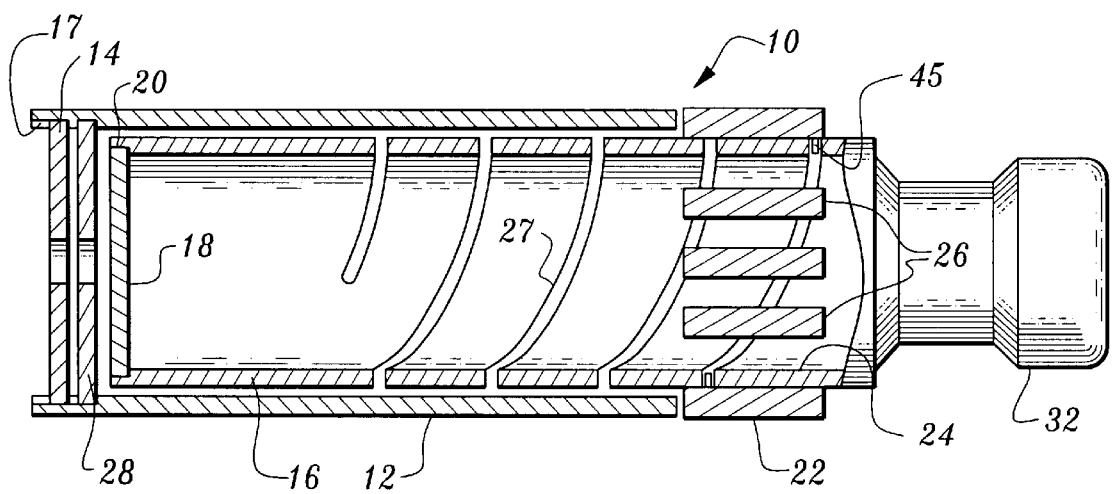
FIG. 1 is a sectional view of a device for cutting, shaving, mincing, grinding, and squeezing foods, according to the invention.

In FIG. 1, a device 10, for cutting, shaving, mincing, grinding, and squeezing foods is shown according to a preferred embodiment of the invention. Preferably, device 10, includes an outer housing element 12, which may be in a tubular, rectangular, square or other configuration. Outer housing element 12, is preferably composed of a durable material such as plastic, thermoplastic, wood, metal, or the like and has a first disc element 14, seen in FIGS. 1 and 2, positioned therein. First disc element preferably is provided with one or more fastening notches or grooves 15, which are configured to be secured within corresponding tracks 17, in outer housing 12, or it may be magnetized, fitted with flanges, or form fitted to outer housing element 12.

Figure 2:
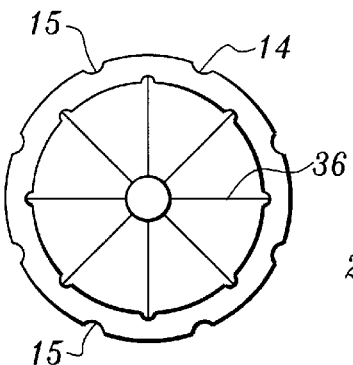
FIG. 2 is a view of a first disc element, according to the invention.
Figure 3:
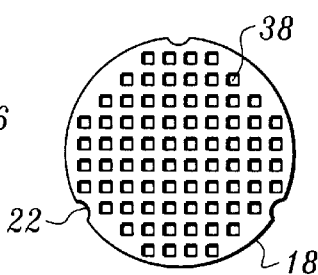
FIG. 3 is a view of a cutting disc, according to the invention.
Figure 5:
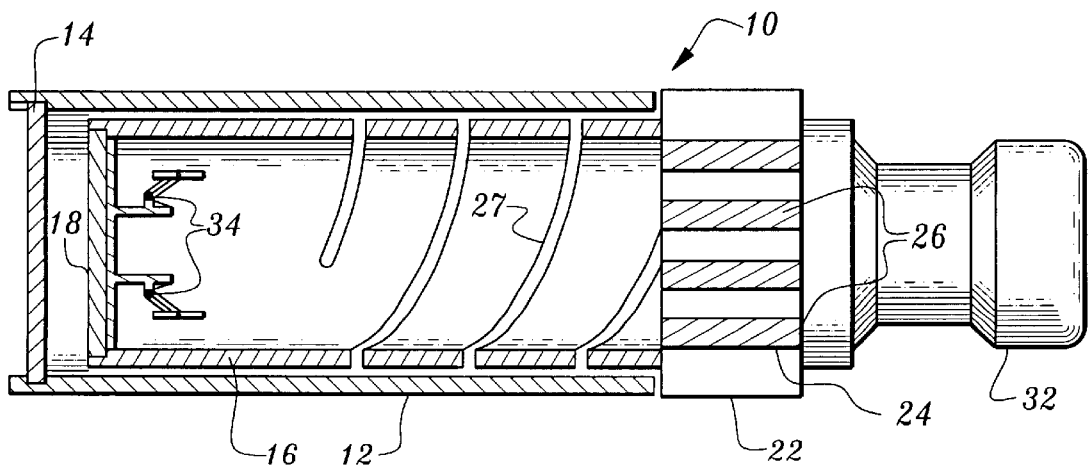
FIG. 5, shows such a device with a spring on the cutting disc, according to the invention.

An inner shaft element 16, is preferably slidably positioned within outer housing element 12. The inner shaft 16, has one or more positioning means for positioning a cutting disc 18, within the inner shaft element. The positioning means may be one or more tracks or channels 20, which connect and secure to notches 22, cutting disc 18, a magnetized disc, flanges or form fitted to inner shaft element 16. A control spring means, preferably comprising spring 34, may be used to facilitate the return stroke of cutting disc 18, on inner shaft element 16, as seen in FIG. 5. Cutting disc 18, as seen in FIG. 2, may be provided in various configurations depending upon the desired application. For example, cutting disc 18 may have various cutting means 38, such as a plurality of spaced apertures, cutting mesh, grill, serrated surface, roughened mashing surface, cutting apertures, and the like.

Preferably, control means for controlling the depth of a cut stroke of inner shaft element 16, are operable secured to inner shaft element 16. In one embodiment, one or more slots 24, or tracks 45, are fitted into control nub 22, and may be provided with cut stops 26. The user, chooses which depth of cut is desired, and rotates control nub 22 accordingly up and down inner shaft element 16. Control nub 22, may be moved up or down in one or more guide slots 27, which are preferably operably positioned on inner shaft element 16, which then controls the reach or extent of the cut of inner shaft element 16. In other embodiments, tracks, rings, notches, or the like, may be used as control means for controlling the depth of a cut stroke.

Figure 4:
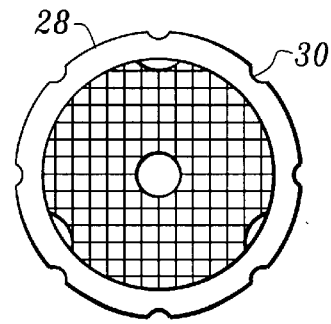
FIG. 4, is an optional disc for securing to the first disc element, according to the invention.

In an alternative embodiment, a third disc 28, with positioning notches 30, seen in FIGS. 1 and 4, is positioned above first disc element 14. Disc 28, adds further stability when cutting disc 18, is pressed against fruits, vegetables, or other foods placed on first disc element 14. Various configurations of disc 28, may be provided, for different applications such as slicing, mashing, juicing, mincing and the like. For example, various spaced apertures, grates, roughened surfaces, and the like may be used. In applications such as potato cutting or apple cutting one or more support pins maybe used on first disc element 14, or if disc 28 is used, the pins or support device may be positioned thereon.

A handle 32, is preferably secured to inner shaft element 16, and may be configured as a continuation of inner shaft element 16, or as a separate, but connected part. Handle 32, is operably connected to control nub 22, and may be used to rotate control nub 22, to a desired position, allowing easy and convenient control of cutting stroke and depth.

First disc element 14, may be provided in a wide variety of configurations and cutting styles. For example, the first disc element 14 may include a plurality of diagonal support edges 34, a grate or mesh configurations, or spaced apertures of the same or different configurations.

A support stand 42, as seen in FIG. 7, may be used to provide additional support and stability for cutting and mincing operations, as well as to provide a storage place for device 10. Support stand 42, may be provided in a variety of configurations, but preferably has support legs 44, spaced at an adequate distance to provide stability during cutting, shaving, squeezing, and mincing operations.

In FIG. 8, an alternative embodiment of disc 28, is shown with guide legs 46, which are preferably composed of a durable, flexible material such as thin metal, plastic or the like. Guide legs 46 position against the inner wall of inner shaft element 16, and facilitate control of cutting, mashing, grating, mincing, squeezing, and grinding operations.

In operation and use, device 10, is very efficient, reliable, and easy to use in all cutting, shaving, mincing, grinding, and squeezing procedures for various foods, including fruits, vegetables, cheese, meats and the like. The user simply inserts the desired cutting disc into inner shaft element 16, and places the food item on first disc element 14, or if a third disc 28, is used, on top of that disc. Cutting depth is adjusted by rotation of nub 22, and then handle 32 is pressed down, pushing inner shaft element 16, with cutting disc 18, against the food. Of course, a great variety of both first disc elements, cutting discs, or third discs may be used depending upon the food item and the desired result.

Food items such as garlic, ginger, cheese, mushrooms, lemons, potato, radish, apple, or any fruit, vegetable or other type of food may be shaved, cut, squeezed, minced, or otherwise prepared easily and reliably with device 10.

Additional advantages and modification will readily occur to those skilled in the art. The invention in its broader aspects is, therefore, not limited to the specific details, representative apparatus and illustrative examples shown and described. Accordingly, departures from such details may be made without departing from the spirit or scope of the applicant's general inventive concept.

What is claimed is:

1. A device for cutting, shaving, mincing, grinding, and squeezing foods, comprising:
    an outer housing element, said outer housing element having a first disc element positioned therein;
    an inner shaft element, said inner shaft element being slidably positioned within said outer housing element; said inner shaft element having one or more positioning means for positioning a cutting disc within said inner shaft element;
    control means for controlling the depth of a cut stroke of said inner shaft element; said control means being operably secured to said inner shaft element; and
    a handle, said handle being secured to said inner shaft element.

2. The device of claim 1, wherein said first disc element has one or more positioning grooves for positioning the first disc in said outer housing element.

3. The device of claim 1, wherein said positioning means for positioning a cutting disc within said inner shaft element comprises one or more tracks in said inner shaft element.

4. The device of claim 1, wherein said positioning means for positioning a cutting disc within said inner shaft element comprises one or more channels in said inner shaft element.

5. The device of claim 1, wherein said first disk element includes a plurality of diagonal support edges.

6. The device of claim 1, wherein said cutting disc includes guide tracks, for positioning the cutting disc within said inner shaft element.

7. The device of claim 1, wherein said cutting disc has a plurality of spaced cutting apertures.

8. The device of claim 1, wherein said cutting disc has a plurality of spaced cutting edges.

9. The device of claim 1, wherein said first disc element has one or more positioning pins for positioning an article of food thereon.

10. The device of claim 1, wherein said cutting disc has a spring secured thereon for operable engagement with said control means.

11. The device of claim 1, further including a second cutting disk, said second cutting disc being positioned within said inner shaft element for operable engagement with said first disk element.

12. The device of claim 1, further including a support stand.

13. A device for cutting, shaving, mincing, grinding, and squeezing foods, comprising:

an outer housing element, said outer housing element having a first disc element positioned at one end thereof;

an inner shaft element, said inner shaft element being slidably positioned within said outer housing element; said inner shaft element having one or more positioning means for positioning a cutting disc within said inner shaft element; and, a handle, said handle being secured to said inner shaft element.

14. The device of claim 13, further including control means for controlling the depth of a cut stroke of said inner shaft element; said control means being operably secured to said inner shaft element.

15. The device of claim 14, wherein said control means for controlling the depth of a cut stroke of said inner shaft element comprises an adjustment nub, said adjustment nub being secured to said handle and to said inner shaft element, and includes one or more tracks operably positioned therein.

16. The device of claim 15, wherein said control means further includes one or more guide slots operably positioned on said inner shaft element.

17. The device of claim 14, wherein said first disc element has one or more positioning grooves for positioning the first disc in said outer housing element.

18. The device of claim 14, wherein said positioning means for positioning a cutting disc within said inner shaft element comprises one or more tracks in said inner shaft element.

19. The device of claim 14, further including a second cutting disk, said second cutting disc being positioned within said inner shaft element for operable engagement with said first disk element, said second cutting disc have one or more guide legs secured thereto.

* * * * *